Nov. 9, 1965   G. P. FERRY   3,216,708
APPARATUS FOR TREATING WATER
Filed Dec. 7, 1959

INVENTOR.
GERALD P. FERRY
BY William R. Price
ATTORNEY

United States Patent Office 3,216,708
Patented Nov. 9, 1965

3,216,708
APPARATUS FOR TREATING WATER
Gerald P. Ferry, 3632 Robin Drive, Louisville, Ky.
Filed Dec. 7, 1959, Ser. No. 857,965
1 Claim. (Cl. 261—111)

This invention relates to treatment of water for controlling biological organisms, particularly algae which thrive on nutrients contained there. The invention relates specifically to control of algae growth in stored water such as, for example, as in ponds, lakes, reservoirs, storage tanks, cooling systems, spray ponds and the like.

Water provides an efficient cooling for air conditioning and refrigeration equipment, internal combustion engines and the like, particularly since heat may be readily and economically removed in evaporative cooling towers. One disadvantage to the use of evaporative cooling towers is the tendency for algae to grow in the towers and impair their efficiency with respect to heat exchange. The algae becomes deposited in hot and cold water basins and are also often drawn into the water jackets and water pipes of cooling systems from the basin which forms the source of supply for the cooling water. The result is that the jackets, circulating pumps, spray nozzles, distribution holes, strainers and water lines become clogged with an accumulation of vegetable matter.

Algae are aquatic plants which may be either microscopic or macroscopic. They are usually visible to the naked eye, although the individual plants may be very small. Thus in ponds and lakes which are stagnant or in which the water is not in very active movement large quantities of these algae will grow, forming a bed on the bottom or sides of the lake or pond, or by rising to the surface, forming the well known green or brown slime thereon. This is particularly noticeable in artificial storage reservoirs, ponds and the like where the algae, particularly the floating variety, cause a great nuisance in that they interfere with the purity of the water and its desirability for other uses.

A great deal of effort has been expended in developing chemical agents to inhibit or destroy slime forming vegetable bodies in water supplies. The various algaecides to be useful, besides being highly effective, must: (1) Have a low vapor pressure so as not to be lost with the evaporating water, (2) be relatively non-toxic, (3) not permit objectionable vapors from the evaporator. This latter requirement is particularly important where the evaporative towers are in residential areas where odorous or irritating vapors must not be evolved. Various agents have been proposed for this purpose. See, for example, U.S. Patents: 2,140,401; 2,221,339; 2,284,859; 2,393,293 and 2,878,155. Chlorine is a good algaecide but is undesirable because of the difficulty of maintaining a suitable concentration of chlorine in waters under the conditions favorable to the growth of algae. Many other materials which are toxic to algae are also highly toxic and harmful to humans, both internally and externally, as in contact with the skin, which makes their use extremely hazardous. Furthermore, heavy use of algaecides tends to form scale on louvers and in water cooled condensers. Algae can be removed from water by filtration, but in removing algae in this manner the filters quickly become clogged, thus increasing filtration cost. In general, filtration is unsatisfactory where the growth is heavy.

It is an object of this invention to prevent the growth of algae in waters which are recirculated for any purpose and where slime or algae tend to accumulate on the surfaces of the equipment with which the water comes in contact.

Another object of this invention is to provide apparatus for inhibiting algae growth in water basins having relatively little movement.

A more specific object of this invention is to provide apparatus for inhibiting algae growth in water cooling towers.

Other objects will become apparent from the detailed description of my invention as follows:

I have discovered that algae growth which occurs as for example in water cooling towers conventionally used in refrigeration and air conditioning systems may be inhibited by the provision of a shading means over the water basin or reservoir. Without in any way limiting the invention, the shading means such as may be utilized in water cooling towers, containing the conventional redwood louvers, may comprise a metal canopy which fits upon supports over the water basin at the bottom of the tower. In the forced draft cooling towers it has been found that algae growth is most prevalent in the water distribution basin at the top of the tower and part of cold water basin at the bottom of the tower. Furthermore, it has been noted that various water softening, surface active dispersing agents utilized for their water softening and germicidal properties, apparently promote the growth of algae. This phenomenon is not completely understood, however it is postulated that the surface active agents contained in the recirculating water supply soften the water to the extent that in running over the louvers of the cooling towers the water picks up small amounts of nutrients which have been deposited thereon from the air, thus supporting the growth of algae in the water basin.

Another possible explanation is that these scale inhibiting agents, in preventing precipitation of calcium carbonate scale, leave more carbon dioxide available in the water, as a nutrient for the algae. Whatever the explanation, it is an established fact that algae growth is more prevalent if the surface active agents are utilized. In some locations the effect of these surface agents in favoring the growth of algae has been so significant that in hot seasons their use has been discontinued. To this extent the practice in the air conditioning and refrigeration industry has been a compromise as to inhibition of slime formation by the heavy use of algaecides to the exclusion of scale prevention through the omission of surface active agents. In other words, the problem of scale formation has been ignored in order to combat algae growth. It is generally accepted, of course, that slime formation is caused by masses of bacteria, fungi and algae, of single species, mixed species, or in any mixture of the three classes. Slime may exist as a purely biological mass or the organisms may serve as bonding agents to bond together various solid materials such as clay, vegetable fibers, chemical precipitates, scale and the like. In any event the result is the same with formations of slime deposited upon water cooling towers with resultant lowering of heat exchange capacity and eventual clogging of the lines.

By the use of the apparatus of my invention, algae growth is almost totally inhibited in various water storage basins and reservoirs. The use of surface active dispersing agents such as the substantially insoluble metaphosphates (which are more fully disclosed in U.S. Patents 2,304,850; 2,337,856; and 2,539,305) as for example calcium metaphosphate, potassium metaphosphate, sodium metaphosphate (Maddrell salt); the glassy dehydrated phosphates of sodium and calcium, sodium and magnesium and/or calcium and magnesium, dehydrated phosphates of aluminum, zinc and strontium, et cetera, is allowed since the nutrients picked up by the waters are not used to support algae growth. Furthermore, the algae are not available as nutrients for bacteria, fungi and the like.

The invention will be better understood by reference to the attached drawings. Referring now to the drawings.

Figure 1:
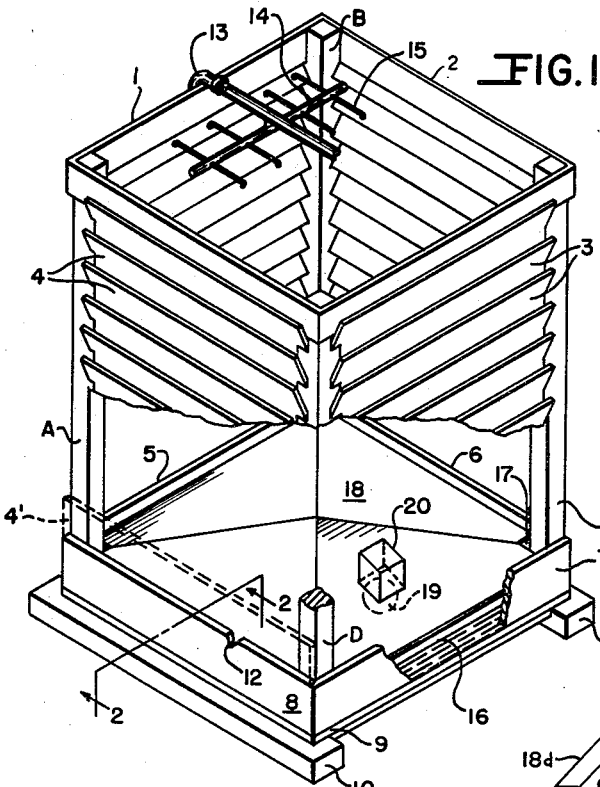
FIG. 1 is an isometric view of the conventional louvered natural draft cooling tower.

Referring now to FIG. 1, numeral 1 designates one wall of redwood louvers, numeral 2 designates another wall of redwood louvers, numeral 3 designates another wall of redwood louvers and numeral 4 designates the fourth wall of redwood louvers. As illustrated the louvers are fit into slots of support designated A, B, C and D, at a slight angle. I have found however, that it is often advantageous to nail the bottom louver to the support in order to minimize loss of water through splashing. This is illustrated by numeral 4'. The walls of the water basin are indicated by numerals 5, 6, 7 and 8, respectively and the bottom of the water basin is designated by numeral 9. All of the members are of conventional design and are usually redwood. Numerals 10 and 11 designate supporting members for the cooling tower. Numeral 12 indicates a notched overflow made in side member 8. Numeral 13 designates a pipe returning the water to distribution pipe 14, which in turn supplies the water to spray nozzles designated generally by numeral 15. Numeral 16 indicates the water level in the water basin and numeral 17 designates the one-half inch of free space normally allowed between the canopy 18 and the sides of the water basin, 5, 6, 7 and 8. This free space, 17, allows for unrestricted flow of water to the basin. The metal canopy as illustrated in FIG. 1 is fabricated of a thin piece of sheet metal bent in two directions by the technique known in duct work as crossbreak. This provides a pyramidal shape which gives strength to the canopy. Numeral 19 designates a float valve normally utilized in cooling towers which has been covered by a metal box designated by numeral 20. It is, of course, necessary to cut a hole in the canopy 18 to allow free space for float valve, 19, operation.

Figure 2:
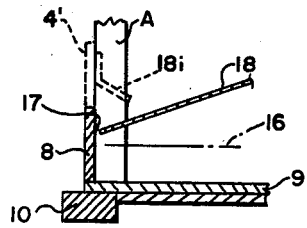
FIG. 2 is a section taken along 2—2 of FIG. 1.
Figure 3:
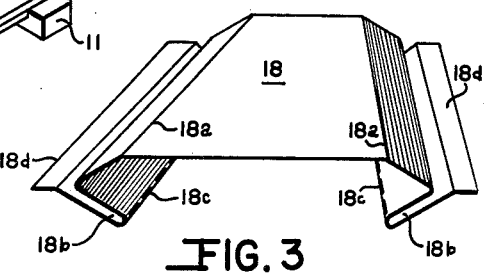
FIG. 3 is a view in perspective of a modification of the shading means utilized in FIG. 1.

As previously indicated the bottom louver is advantageously nailed to the supporting members which is indicated in FIG. 2 by numeral 4'. In this case it is sometimes advantageous to provide a piece of sheet metal bent at an angle toward the interior of the tower which is illustrated in FIG. 2 as 18i. This sheet metal flange reduces loss of water through splashing and also shades the free space designated by numeral 17 around the periphery of the water basin. It is, of course, necessary to provide space 17 or its equivalent to allow for free flow of the water. FIG. 3 shows a modification of the shading means 18 which is fabricated of sheet metal which has been creased along line 18a, bent inwardly to form trough 18b and outwardly to form flange 18d. Apertures all along the bottom of trough 18b are designated 18c. In this modification the two extending flanges 18d fit upon the walls of the water basin to support the shading means, water flows into the trough 18b (which is well protected from the sun) and then through the apertures 18c into the basin.

Figure 4:
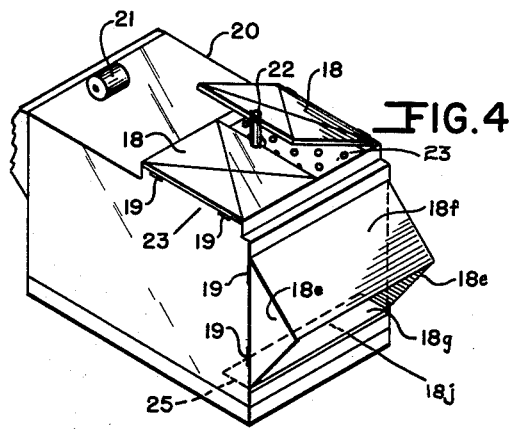
FIG. 4 is an isometric view of a forced draft cooling tower.
Figure 6:
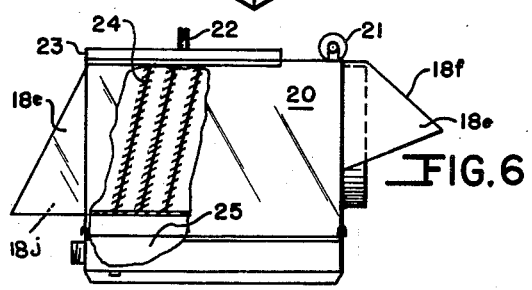
FIG. 6 is a side elevation of a forced draft cooling tower.

In FIG. 4 the housing of the forced draft cooling towers is indicated generally by numeral 20. The motor for the fan is indicated by numeral 21 and the pipe bringing in the water is indicated by numeral 22. The water distribution pipe is indicated by 22 and the distribution basin is indicated generally by numeral 23. It will be noted that the water distribution basin is equipped with several holes of ⅜ to ⅝ inch in diameter. Algae growth has been found to be prevalent around these holes. In this modification, the shading means comprises two flat members, 18, with hinges, designated by numeral 19 so as to be readily lifted for any service that may be required. The two flat plate members are equipped with semi-circular apertures for admission of pipe 22. The water reservoirs of the forced draft cooling tower is indicated generally by numeral 25 and the louvers are best shown in FIG. 6, and designated by numeral 24. At each end of the tower a shading structure is provided. The desired modification comprises four parts, 18e at either side, 18f at the top and 18g which is a piece of metal which extends above the exposed portion of the water reservoir 25. The members indicated by 18e are equipped with hinges designated by numeral 19. It will be noted that the four members define an opening 18j, through which air may be pulled by the fan.

Figure 5:
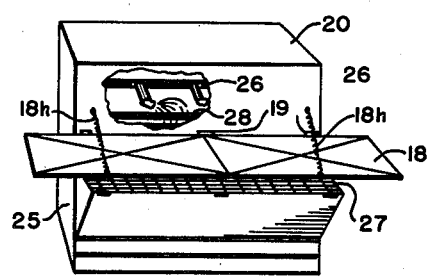
FIG. 5 is a view from the front of an evaporative condenser.

FIG. 5 is an illustration of a conventional evaporative condenser equipped with sun shade 18, held in place by sun shade supports 18h. The housing of the condenser is indicated generally by numeral 20, the spray nozzles of the condenser are indicated by numeral 26, the condenser coils are indicated by numeral 28, and the water level of the reservoir is indicated generally by numeral 25. A screen or grid work over the air intake of the evaporative condenser is indicated by numeral 27. The evaporative condenser as shown is of conventional design and contains a fan, a mist eliminator and vents, all of which are not illustrated.

EXAMPLE

A test for establishing slime or algae formation was run as follows: Six shallow pans, approximately 8 by 24 inches and 2 inches deep, were filled to a depth of about 1 inch with municipal tap water. About one quarter of a teaspoon of top soil was added to each pan. To pans 1 and 2 a pinch of a pulverized Calgon algaecide pellet (manufactured and sold by Calgon, Inc., Pittsburgh, Pa.) was added and about a teaspoon of Calgon Micromet plates. To pans 3 and 4 about a pinch of a pulverized Calgon algaecide pellet was added but without the Calgon Micromet plates. Nothing was added to the water in pans 5 and 6.

Pans 2, 4 and 6 were completely covered with a piece of sheet metal and all the pans were left in the open in the summer heat (ranging from about 80 to 95° F.) for about a month. At the end of this time the uncovered pans contained a green slimy growth on the bottom and sides. Pan 5 in which the water was untreated had the heaviest growth of algae. Pan 1 containing the algaecide and Micromet contained an intermediate algae bed and pan 3 containing only the pulverized algaecide pellet had only a tinge of algae. Pans 2, 4 and 6, when uncovered, were crystal clear with no evidence of algae growth.

Another test was run covering only a portion of the pan filled with untreated water. The sheet metal covering was arranged so as to cover one corner of the pan completely with its outer edge running diagonally to the opposite corners for the length of the pan. After about 21 days there was a visible greenish bed of algae at the bottom of the pan. When the covering was removed it was found that the growth stopped abruptly under the covered portion of the pan and defined a line across the bottom thereof straight enough to have been made by a straight edge.

In a full scale commercial test a fifty-ton forced draft air conditioning tower was used which was heavily infested with algae in the distribution basin and in the sump or water basin. Water for this tower was obtained from the Ohio River instead of from the municipal water supply and the algae growth appeared brown with some green, rather than green.

To combat this condition the slime was scooped out and the tower hosed out. The bags of Micromet plates were removed from the water distribution basin and the sump algaecide pellets were increased from 2 pellets per 50 gallons to about 4 pellets per 50 gallons of water in the system. Although this treatment appeared to alleviate the condition, within about two weeks the tower was again infested with algae. Permission was granted to install shading means over the distribution basin, over the water basin or sump and at the air inlet (as illustrated in FIGS. 4 and 6). The tower was again cleaned out and the shading means installed. Two weeks later the water in the tower was crystal clear and there was no evidence of algae growth. Micromet bags were installed in the water distribution basin 23, and the water basin or sump 25, and there was no evidence of algae growth or slime formation after a month's operation when the tower was drained and flushed out with a hose to remove dirt as part of the regular monthly maintenance.

Another test was made with a 3-ton forced draft, residential sized tower by shading the air outlet on top of the tower. This stopped a very small algae growth completely.

Although in the drawings the shading means have been illustrated as fabricated of sheet metal, it will be obvious that other materials of fabrication can be used, such as plastic, et cetera. It will be appreciated that other designs of canopies for the natural draft cooling towers can be utilized as well as other designs of the awning-type structures utilized over the ends of the forced-type towers. It will be appreciated that the shading means may be adjusted to compensate for the direction and angle of the sun's rays according to the location of the tower.

It is obvious that many modifications can be made which should not depart from the spirit and scope of the invention, except as to be commensurate with the scope of the appended claim.

I claim:

In an evaporative cooling apparatus including a louvered tower of the natural draft type, wherein liquid water passing through the tower is contacted by a current of air flowing into and out of the tower for use with a water distribution system which includes water distributing means, a wetting surface against which water is contacted, and a basin for collecting water for use in said water distribution system; the combination therewith of a shading means for preventing algae growth in said basin, said shading means consisting of a continuous light impermeable pyramidal-shaped sheet metal canopy, installed directly over the water basin at the bottom of said tower in which the peripheral edge of said canopy defines a free space of at least half an inch from the walls of said basin, said pyramidal-shaped canopy having an apex and sloped sides, means for directing water past said canopy into said basin, said canopy being further combined with a flange member extending around the interior periphery of said basin and extending laterally from the walls of said basin, above the free space defined by the peripheral edge of said canopy and which overlaps the peripheral edge of said canopy to shade said free space.

References Cited by the Examiner

UNITED STATES PATENTS

| | | |
|---|---|---|
| 1,225,889 | 5/17 | Thomas. |
| 1,905,422 | 4/33 | Rasmussen. |
| 1,926,970 | 9/33 | Cline. |
| 1,929,410 | 10/33 | Coey. |
| 1,986,653 | 1/35 | Wade. |
| 2,358,965 | 9/44 | Durgin et al. _____ 210—57 |
| 2,381,960 | 8/45 | Johnson _____ 210—57 |
| 2,540,091 | 2/51 | Brackney. |
| 2,606,008 | 8/52 | Lau Bach _____ 261—151 |
| 2,631,022 | 3/53 | Baird et al. _____ 261—30 |
| 2,680,603 | 6/54 | Taylor. |

REUBEN FRIEDMAN, *Primary Examiner.*

HARRY B. THORNTON, HERBERT L. MARTIN, *Examiners.*